C. F. AND O. J. CROMMETT.
APPARATUS FOR PRODUCING LIQUID OXYGEN.
APPLICATION FILED JAN. 7, 1914. RENEWED JULY 1, 1916.
1,354,380. Patented Sept. 28, 1920.
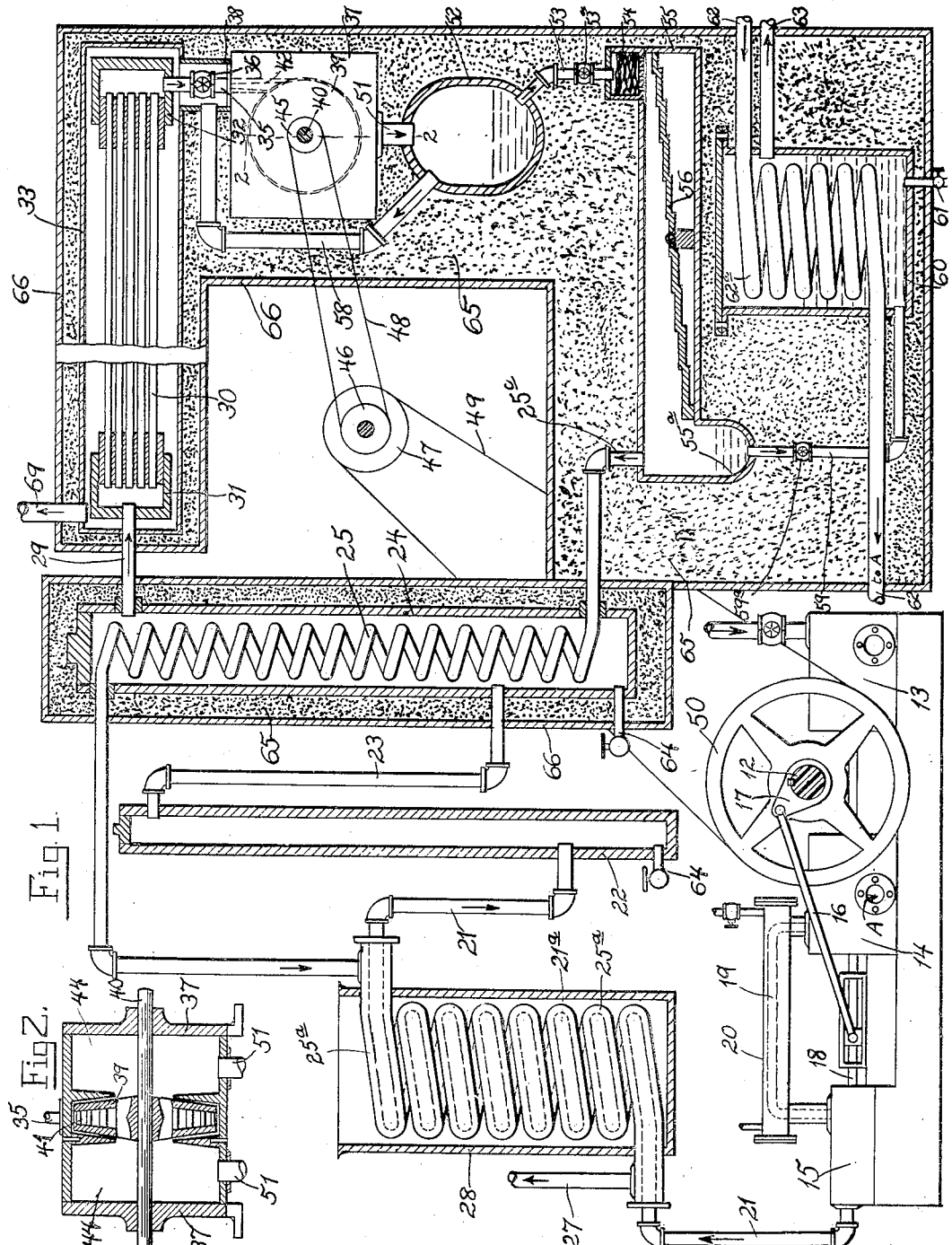

UNITED STATES PATENT OFFICE.

CHARLES F. CROMMETT AND ORRIN J. CROMMETT, OF CHELSEA, MASSACHUSETTS, ASSIGNORS, BY MESNE ASSIGNMENTS, TO GODFREY L. CABOT, OF CAMBRIDGE, MASSACHUSETTS.

APPARATUS FOR PRODUCING LIQUID OXYGEN.

1,354,380.      Specification of Letters Patent.      Patented Sept. 28, 1920.

Application filed January 7, 1914, Serial No. 810,795. Renewed July 1, 1916. Serial No. 107,102.

*To all whom it may concern:*

Be it known that we, CHARLES F. CROMMETT and ORRIN J. CROMMETT, both citizens of the United States of America, and residents of Chelsea, in the county of Suffolk and State of Massachusetts, have invented certain new and useful Improvements in Apparatus for Producing Liquid Oxygen, of which the following is a specification.

This invention has for its object to provide an apparatus adapted economically to produce liquid oxygen from atmospheric air, by compressing, cooling and expanding air, whereby a portion of the air is liquefied, and using the unliquefied portion of air as a refrigerant, evaporating the liquid air in an atmospherically-heated distillator sufficiently to drive off its more volatile element, nitrogen, as a gas, using such gas as a refrigerant, and using the remaining oxygen and vapor rising therefrom for refrigerating the air entering the compressor of the apparatus. Although the production of liquid oxygen is the chief purpose of the apparatus, gaseous oxygen and gaseous nitrogen are included in its products.

Of the accompanying drawings:—

Figure 1 represents a sectional view of an apparatus embodying our invention, parts being shown in elevation.

Fig. 2 represents a section on line 2—2 of Fig. 1.

The same reference characters indicate the same parts in all the figures.

In the drawings,— 12 represents the crank-shaft of an air compressor which may be driven by a suitable motor such as a steam engine, the steam cylinder of which is shown at 13. The compressor, as here shown, has a low pressure cylinder 14 and a high pressure cylinder 15, the pistons in these cylinders being driven by the crank-shaft through suitable connections including a pitman 16 connecting the crank 17 with a cross head secured to the piston rod 18. The partially compressed air passes from the cylinder 14 to the cylinder 15 through a conduit 19 in a jacket 20 through which cold water or other cooling agent is circulated.

Compressed air passes from the cylinder 15 through a conduit 21 having a helically coiled portion 21ª to a primary separator 22 which is a vertically elongated receptacle on the walls of which some of the moisture carried by the air is condensed. From the primary separator the air passes through a conduit 23 to a secondary separator 24 which is also a vertically elongated receptacle containing the helically coiled portion 25 of a conduit through which gas rich in nitrogen at a very low temperature passes upwardly from the source hereinafter described and freezes the remaining moisture in the air passing through the secondary separator. The nitrogen conduit includes a helically coiled portion 25ª connected with the portion 25 and inclosing the helical air conduit portion 21ª. The cold gas rich in nitrogen passes downwardly through the helical portion 25ª and reduces the temperature of the compressed air passing upwardly through the helical portion 21ª, the gas rich in nitrogen finally passing through an outlet 27 either to the atmosphere or to a suitable receptacle in which it may be stored. The conduit portions 21ª and 25ª and a holder or casing 28 containing the same constitute a primary regenerator. The compressed air passes from the secondary separator 24 through a pipe 29 to a secondary regenerator composed of a plurality of straight horizontal copper tubes 30 open at both ends, chambered headers 31, 32 communicating with the opposite ends of said tubes, the header 31 receiving the pipe 29, and a horizontal casing or chamber 33 inclosing the said tubes and headers. The compressed air passes through the header 31, tubes 30 and header 32, is additionally cooled therein as presently described, and passes from the header 32 through a pipe 35 having a valve 36, to a chamber in which it is allowed to expand, the expansion resulting in the liquefaction of a considerable part of the air. The said chamber as here shown is the casing 37 of a turbine constructed as shown in our pending application filed November 10, 1913, Serial No. 800,050. The pipe 35 is surrounded by a branch 38 of the casing 33.

The said turbine comprises a rotor 39 mounted on a shaft 40, and provided with buckets 41 at its periphery against which the air is directed by one or more tangentially arranged nozzles 42 communicating with the pipe 35. The rotor is provided with a conduit extending inwardly from the buckets toward the shaft, said conduit being formed to permit the expansion of the air and to discharge the liquid and the remaining gas from opposite sides of the rotor, as near the shaft 40 as possible, into exhaust chambers 44 of uniform size and shape at opposite sides of the rotor, all as described, in said pending application. The air in expanding is therefore caused to perform work, the rotor shaft 40 being connected by suitable means such as the pulleys 45 and 46, belts 48 and 49, and fly wheel 50 with the crank-shaft 12 of the compressor.

The exhaust chambers 44 are connected by pipes 51 with a container 52 which receives the liquid and unliquefied gases. The liquid passes through a pipe 53 having a valve $53^a$ and a filter 54 to a distillator composed of a casing 55 and a stepped table 56 having a descending series of horizontal faces and intermediate vertical shoulders.

The cold unliquefied gases pass from the container 52 through a pipe 58 to the casing branch 38 in which they impinge on the pipe 35 and from which they pass into one end of the casing 33 of the secondary regenerator, and after passing through said casing in contact with the horizontal regenerator tubes 30, escape through an exhaust pipe 69 at the opposite end of the casing 33. The exhaust gases from the container 52 therefore additionally reduce the temperature of the compressed air passing through the secondary regenerator and the pipe 38.

The liquid entering the distillator casing 55 falls upon the higher end of a stepped table 56. As the liquid passes over said table practically every particle of the liquid is exposed to the gaseous atmosphere of the casing 55, and since the more volatile nitrogen is the part we desire to evaporate, the stepped table offers a highly efficient means of bringing the nitrogen in the liquid to the surface. The heat necessary for volatilizing the liquid flowing over the stepped table 56 may come from sources both external and internal, such as from chamber 60 which is in close proximity to chamber 55, and from the atmosphere through the imperfect insulation of the chamber 55. The nitrogenous gas rising from the table escapes through an exhaust pipe $25^c$, which forms a part of the above described nitrogen conduit, at a temperature of approximately 200° below zero F. passing as described through the portions 25 and $25^a$ of said conduit and literally freezing out the moisture in the air passing through the separator casing 24 and reducing the temperature of the air passing through the primary regenerator. The remaining liquid oxygen flows into a depression $55^a$ at one end of the distillator and passes from thence through a pipe 59 (having a valve $59^a$) to a reservoir 60 from which it may be drawn off as required through a valved outlet 61.

The air supplied to the intake A of the low pressure cylinder passes through a conduit 62 having a coiled portion $62^a$ located in the oxygen reservoir and subjected to the low temperature of the oxygen gas which rises from the liquid oxygen in said reservoir, the air being thus preliminarily chilled before entering the compressor. The oxygen gas passes from the reservoir 60 through an outlet pipe 63 to a suitable receptacle.

Water of condensation may be drawn from the moisture separators 22 and 24 through valved outlets 64. The filter 54 may be a casing having a perforated bottom and containing layers of filter paper, the chief function of the filter being to arrest impurities such as carbon dioxid which may be subsequently allowed to escape in gaseous form when the apparatus is not in use and the valve $53^a$ is open. Various parts of the apparatus are inclosed in non-conducting material 65 which is preferably ground cork retained in place by suitable external casing walls 66. The straight tubes 30 of the secondary regenerator conduct the high pressure air with the minimum of friction, there being no change of direction of the air passing through said tubes as would be the case if a coiled tube or tubes were employed. There may be any desired number of tubes 30, the combined surface areas of the tubes insuring an effective temperature reducing action of the cold gases from the container 52.

The regenerator headers and tubes form parts of a conduit which conducts air at high pressure from the compressor to the point of separation of the liquid, from the gaseous elements, said point being within the casing 37. The separators 22 and 24 also form parts of the air conduit.

We claim:—

1. An apparatus of the character stated comprising an air conduit including a separator casing, a cooling conduit having a portion extending through the separator casing and a portion inclosing the air conduit outside said casing, means for forcing air at high pressure through the air conduit, and means for delivering nitrogenous gas at a temperature below freezing to the cooling conduit, whereby the temperature of the high pressure air is preliminarily reduced, and moisture is frozen out of it in the separator casing.

2. An apparatus of the character stated comprising an air conduit including a primary separator casing and a secondary separator casing, connected in series, a cooling conduit having a portion extending through the secondary separator casing and a portion inclosing the portion of the air conduit leading to the primary separator casing, means for forcing air at high pressure through the air conduit, and means for delivering nitrogenous gas at a temperature below freezing to the cooling conduit.

3. In an apparatus of the character stated, a distillator comprising an atmospherically heated casing having a liquid inlet at one end, a liquid outlet at the opposite end, and a gas outlet, and a stepped table within the casing arranged to receive liquid from said liquid inlet and conduct it to the liquid outlet, the liquid being rolled in its passage over the table and giving off gas which escapes through the gas outlet.

4. An apparatus of the character stated comprising an air compressor, an air conduit leading from the compressor, said conduit including a regenerator, means at the delivering end of the conduit for liquefying air, means for vaporizing the more volatile portion of the liquid, a reservoir for the residual liquid, and an air supply pipe leading through said reservoir to the intake of the compressor, the air being cooled on its way to the compressor by the latent heat of vaporization of the residual liquid.

5. An apparatus of the character stated comprising an air compressor, an air conduit leading from the compressor, said conduit including a regenerator, means at the delivering end of the conduit whereby a portion of the air delivered thereto is liquefied, means whereby the unliquefied air is conducted to said regenerator as a refrigerant, means for vaporizing the more volatile portion of the liquid air, means whereby said vaporized portion is used to cool compressed air in the apparatus, a reservoir for the residual liquid, and an air supply pipe leading through said reservoir to the intake of the compressor, the air being cooled on its way to the compressor by the latent heat of vaporization of the residual liquid.

6. An apparatus of the character stated, comprising an air compressor, an air conduit leading from the compressor, said conduit including a regenerator, means at the delivery end of the conduit for separating air at low temperature into liquid and gaseous elements, and an imperfectly insulated distillator which receives the separated liquid and, under the heat conducted to the space of the distillator, releases and permits the removal of the more volatile portion therefrom.

7. An apparatus of the character stated, comprising an air compressor, an air conduit leading from the compressor, said conduit including a regenerator, means at the delivery end of the conduit for separating air at low temperature into liquid and gaseous elements, an imperfectly insulated distillator which receives the separated liquid and, under the heat conducted to the space of the distillator, releases and permits the removal of the more volatile portion therefrom, and means providing for the agitation of the liquid within the distillator to more effectively apply the heat conducted to the distillator space to the liquid therein.

In testimony whereof we have affixed our signatures in presence of two witnesses.

CHARLES F. CROMMETT.
ORRIN J. CROMMETT.

Witnesses:
C. F. Brown,
P. W. Pezzetti.